Patented Nov. 19, 1940

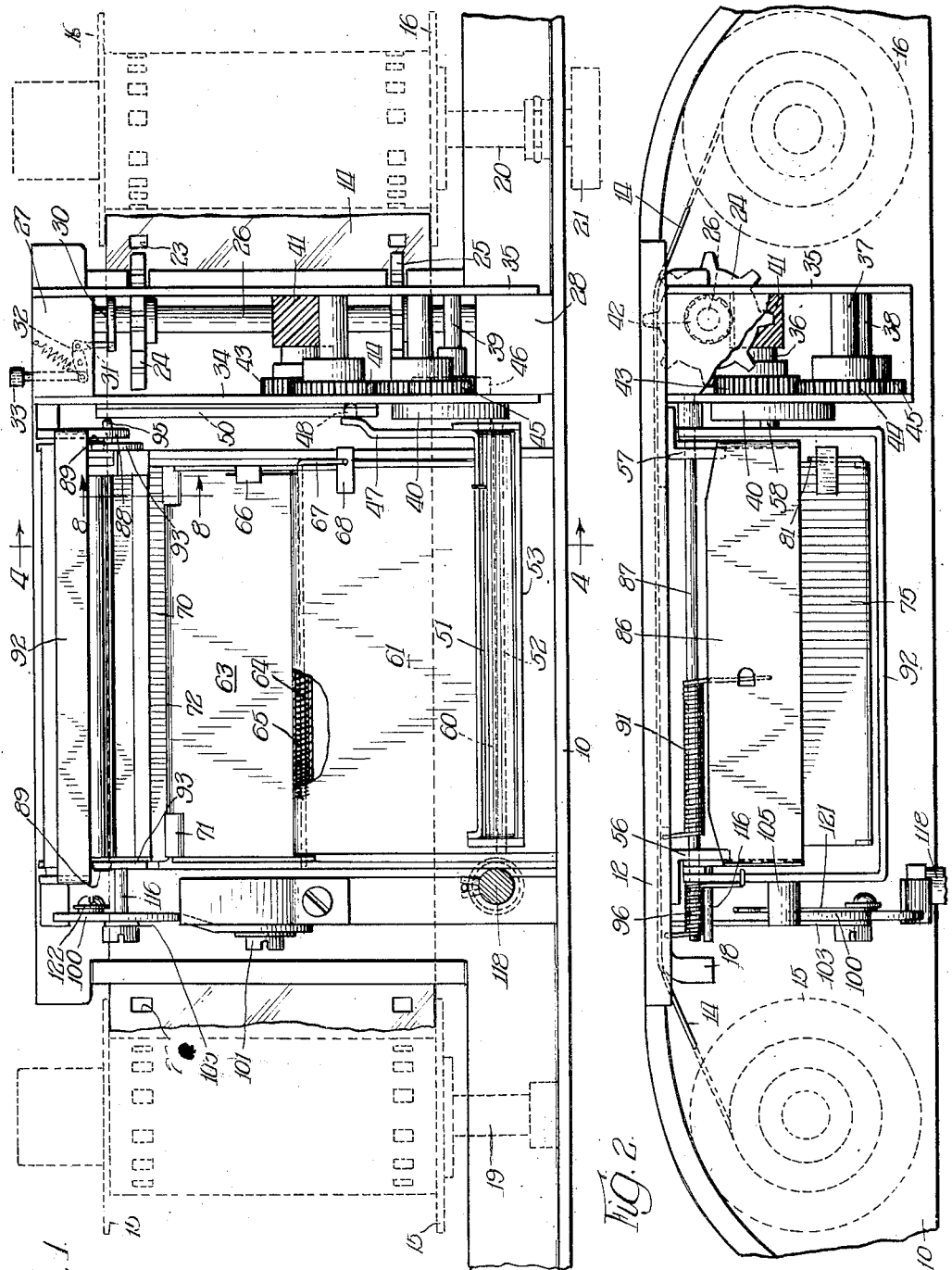

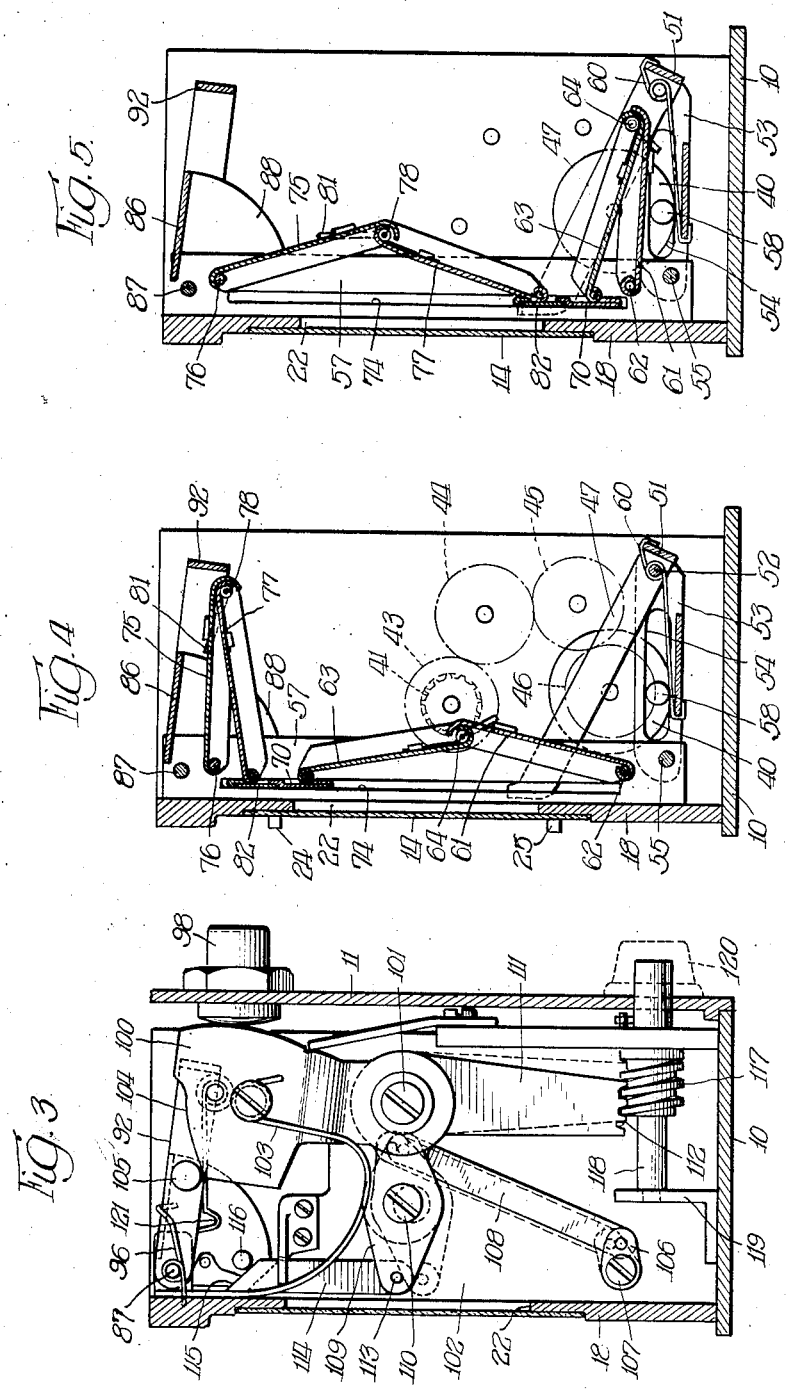

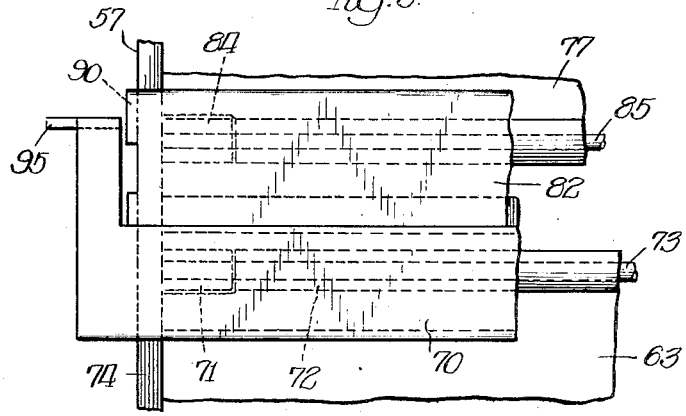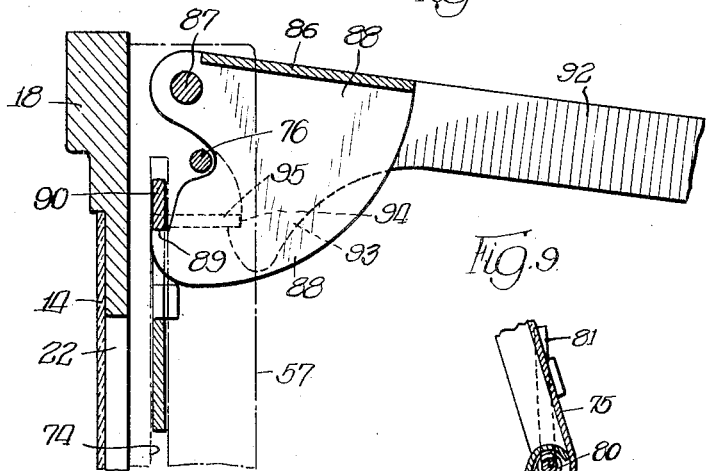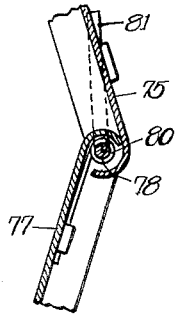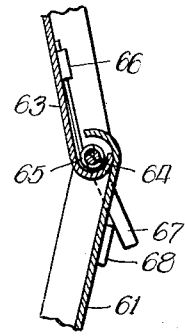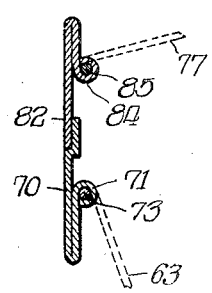

2,222,041

UNITED STATES PATENT OFFICE 2,222,041

CAMERA

Lewis H. Moomaw, Wilmette, Ill.

Application December 8, 1938, Serial No. 244,504

18 Claims. (Cl. 95—55)

The invention relates to cameras and has more particular reference to novel shutter mechanism and improved means for tripping the same which will render possible a complete range of exposures.

The invention has for its primary object the provision of an improved multiple section shutter of the focal plane type wherein one section is released independently of the other section and will have movement independently thereof so that the interval elapsing between the tripping of the sections will provide for exposures of different time duration.

Another object of the invention is to provide improved mechanism for releasing the sections of the present shutter and which mechanism can be manually adjusted to vary the shutter gap or aperture and thus the length of the exposure.

A further object resides in the provision of a multiple section shutter wherein the shutter aperture or gap will be of uniform width by reason of the novel manner in which the sections are arranged for movement and the rigid construction of the sections which maintains the adjacent edges defining the aperture in perfect alignment.

Another advantage of the present shutter resides in the ease with which the sections can be returned to initial position and wherein the shutter aperture on said return movement will be closed.

A further object is to provide shutter return means of simple construction which will receive actuation from the film so that as the film is wound following an exposure the shutter is automatically returned and latched in readiness for another actuation. A camera equipped with the shutter mechanism of the invention will take pictures as rapidly as the shutter can operate and the film be wound for subsequent exposures.

Another object of the invention is to provide a multiple section shutter of simple construction which can be economically manufactured as the same comprises a number of metal stampings and which will provide a shutter gap having movement relatively close to the film to therefore approximate very closely a true focal plane shutter.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is an elevational view of the shutter mechanism of the invention showing that side of the same which is disposed toward the lens of the camera;

Figure 2 is a top plan view of the shutter mechanism shown in Figure 1;

Figure 3 is an end elevational view showing the manual means for releasing the leading section and the adjustable mechanism for varying the time of release of the following section;

Figure 4 is a sectional view taken substantially along line 4—4 of Figure 1 showing the shutter mechanism in latched position;

Figure 5 is a sectional view similar to Figure 4 but showing the shutter parts in the position they assume after an exposure has occurred;

Figure 6 is an enlarged fragmentary elevational view showing the shoes for the leading and the following section in associated relation, and also showing the manner of pivotally securing the same to their respective sections;

Figure 7 is an enlarged fragmentary sectional view illustrating the separate latching means for the leading and the following section; and Figure 8 is an enlarged sectional view taken substantially along line 8—8 of Figure 1.

Figures 9 and 10 are enlarged fragmentary sectional views showing the hinged connections of the shutter parts.

In the embodiment of the invention selected for illustration in the drawings, the shutter mechanism is housed within a camera of conventional design including a bottom frame member 10, a front member 11, and a releasable rear member or cover plate 12. The cover plate can be removed by the operator in order to load the camera with film 14 which is wound on spools 15 and 16 journalled on the respective sides of an aperture plate 18 by the shafts 19 and 20. The shaft 20 extends to the bottom frame 10 and is provided with a knob or disc 21 by which the film is wound onto spool 16 after each exposure. The aperture plate 18 is suitably fixed in position on the bottom frame and extends upright therefrom, having an aperture 22, Figures 4 and 5, which will frame a section of the film for exposure by the shutter mechanism to be described.

The film strip is formed with perforations 23 extending in equal spaced relation along the top and bottom edges and which engage the sprocket wheels 24 and 25, respectively. Said sprocket wheels are fixed to a vertical shaft 26 journalled at its ends in members 27 and 28. Said sprockets extend outwardly through openings in the aperture plate and mesh with the perforations in the film, and accordingly as the film is wound onto the spool 16 the shaft 26 will be rotated. The design of the parts is such that the sprockets make one complete revolution in winding one exposed section of film and this rotation of the shaft 26 is utilized to cock the shutter mechanism, that is, to return the sections of the present shutter to their initial latched position in readiness for another exposure. The collar 30, Figure 1, fixed to the upper end of shaft 26, is provided with a notch adapted to receive the pin 31, operatively connected through link 32 with the button 33, extending above the top plate of the camera and which must first be depressed by the operator to release the shaft 26 before the film can be wound.

The spaced upright members 34 and 35 journal a plurality of shafts 36, 37, 38 and 39 which carry gears forming a gear train operatively connecting the eccentric 40 with said shaft 26. More specifically, shaft 36 carries a worm gear 41 meshing with the worm gear 42 on the sprocket shaft. Said shaft 36 is also provided with a pinion 43 which meshes with pinion 44 on shaft 37. The gear train also includes pinion 45 on shaft 38 and the gear 46 meshing therewith and fixed to shaft 39, which shaft carries the eccentric 40. On that side of the upright 34 opposite the gear train there are provided members which form a vertical groove providing guiding means for the arm 47. The pin 48 on the upper end of this arm rides within the groove identified by numeral 50. The lower end of the arm 47 is provided with a portion 51 pivotally secured by shaft 52 to a frame 53. One arm of said frame is formed with an elongated slot 54 and the respective side pieces thereof are pivotally secured by shaft 55 journalled by the spaced supporting members 56 and 57 which project from and are suitably secured to the aperture plate 18. The pin 58 on the eccentric 40 rides within slot 54 so that the frame 53 is thereby oscillated by rotation of the eccentric. This oscillating movement is imparted to arm 47, pivotally secured to the frame, and accordingly the upper end of the arm is caused to reciprocate within slot 50. The arm 47 and its integral portion 51 is yieldingly tensioned by the spring 60 coiled around shaft 52 and having securement at one end to said shaft and at its other end to portion 51. The spring tends to yieldingly bias the arm 47 in a counter-clockwise direction, Figure 5. The above structure provides for returning the sections of the present shutter to initial latched position.

The shutter consists essentially of metal stampings which can be cheaply manufactured and easily assembled and wherein the shutter aperture provided thereby will move in a vertical plane relatively close to the film. Essentially the present shutter mechanism consists of an upper section and a lower section and which are released independently, the lower section by manual means and the upper section automatically as a result of movement of the lower or leading section. Describing first this leading section, the same includes a pivoted part 61 suitably supported for pivotal movement by the shaft 62 which extends between and is supported by the spaced members 56 and 57. The part 63 of the lower section is pivoted to part 61 by means of shaft 64 and which parts are yieldingly tensioned by spring 65, Figure 1, so that the parts tend to overlie the same as shown in Figure 5. Said spring is secured at one end to shaft 64 and at its other end to part 63 by means of the projection 66. For the purpose it is necessary to hold the shaft against rotation and which is accomplished by the bent end 67 held by stop 68 secured to part 61 of this section.

As best shown in Figures 1 and 6, the upper end of part 63 of the lower section has pivotally secured thereto a shoe 70 also consisting of a metal stamping having a cross sectional shape, as shown in Figure 8. The surface of said shoe directed toward the film strip 14 is imperforate throughout its extent since the metal is bent back on itself to provide bearing portions 71 at the respective ends of the shoe. The space between the bearing portions 71 is occupied by the bearing 72 formed integral with part 63. A shaft 73 extends through said bearing portion, thereby pivotally joining said shoe to part 63 of the lower section. Each of the supporting members 56 and 57 is slotted vertically, as at 74, and these slots receive the respective ends of the shoe to hold the shoe vertically aligned and to confine its movement to a vertical plane paralleling the plane of the film strip 14.

The upper or following section of the present shutter is constructed similarly to the lower section and includes a pivoted part 75 pivotally supported by shaft 76, journalled by members 56 and 57. The part 77 is pivotally secured to the end of part 75 by the shaft 78 and which parts are yieldingly tensioned by a coil spring 89 fixed at one end to shaft 78 and at its other end to part 77. The coil spring yieldingly forces the parts 75 and 77 in a direction to cause them to straighten out and for the purpose the end of shaft 78 is bent and held at 81. Also, as will be clear by reference to Figures 6 and 8, the lower end of part 77 of the upper section has pivotally secured thereto a shoe 82 which has interfitting engagement with shoe 70 by reason of the shoulder 83 formed on said lower shoe. The metal of shoe 82 is bent back upon itself at its upper edge and this metal at the respective ends of the shoe is curved to form journal portions 84 which receive shaft 85, thereby pivotally securing part 77 to said shoe. A feature of the invention resides in the construction of shoes 70 and 82 wherein the metal is bent back upon itself to form the bearing portions by which the shoes are pivotally secured to their respective sections. The face of the shoe is therefore imperforate and an effective light shield is provided thereby.

Each section of the present shutter may be described as light excluding and also as consisting essentially of a part journalled for pivotal movement about a fixed axis and having a second part pivoted to the free end thereof. Although the fixed axes for the shutter sections are shown in the drawings as extending in the direction of the film strip it is entirely practical for the said axes to extend transversely of the film strip. In either case the construction and operation of the shutter would be the same. The only requirement in this connection is that the pivotal axes be disposed parallel to the plane of the film strip and the claims should be interpreted accordingly.

The latching means for the upper or following section consists of a plate member 86, Figures 2 and 7, pivotally supported from the members 56 and 57 by the shaft 87 and having depending side pieces 88 formed with the latching recess 89, the said pieces being located to the outside of the members 56 and 57. Pins 90, formed integrally on each side of the upper shoe 82, extend beyond the members 56 and 57, and these pins are adapted to have latching engagement with said depending side pieces 88 of the plate member 86. As a result the upper section is held in latched position since the member is yieldingly tensioned in this direction by the coil spring 91 surrounding the shaft 87, and which is fixed at one end to the apertured plate 18 and at its other end to said member. The latch for the lower section consists of a frame 92 of substantially U-shape and which likewise is pivotally supported by shaft 87. It will be observed that the sides of frame 92 are located to the outside of the depending pieces 88 of member 86. As shown in Figure 7 the frame 92 is likewise formed with a depending piece 93 having a recess 94 therein which is adapted to latch the pin 95 forming part of the lower shoe 70. Said pin 95 is at all times located below the pin 90 on the upper shoe 82 and accordingly piece 93, providing the latch therefor, will depend some distance below the piece 88 of the member 86. Frame 92 is similarly tensioned into latching position by the coil spring 96, carried by shaft 87 and fixed at one end to the aperture plate and at its other end to said frame.

Pin 95, on the lower shoe 70, extends beyond its latching piece 93, which therefore brings said pin into associated relation with the vertical groove 50. This will be evident by reference to Figure 1 and it will be observed that when the shutter sections are in released position the pin 95 will contact and rest on the upper end of lever 47. Said lever is actuated upon movement of the film, which will occur following each exposure and as a result said lever and pin 48 will move up and down within the slot 50. Upward movement will accordingly be imparted to pin 95, to the shoe 70 integral therewith, and to the upper and lower sections of the shutter. When the sections reach their uppermost position the latching means will become operative to hold said sections in their upper latched position in readiness for another exposure. However, the lever 47 will travel downwardly, coming to rest in its lowermost position, since one complete revolution of shaft 26 will likewise impart to eccentric 40 a complete revolution so that the cycle above described will take place.

The structure for releasing the shutter sections is shown in Figure 3. The button 98, located in the front wall 11 of the camera, is adapted to actuate a cam lever 100, suitably pivoted at 101 to frame piece 102. A length of spring wire 103 yieldingly biases the cam lever 100 against button 98 so that upon said button being depressed movement of the cam lever takes place against the tension of this spring. Said lever 100 is formed with a cam surface 104 adapted to have engagement with the roller 105 carried by frame 92. It will therefore be seen that when the button 98 is depressed the roller 105 will be cammed by lever 100 and corresponding upward movement will be imparted to said frame 92. This will release pin 95 and accordingly the lower or leading section of the shutter will travel downwardly as a result of the tension on the pivoted parts effected by spring 65. The upper or following section of the shutter is released by means actuated by movement of the lower section. The shaft 62 was described as fixed to part 61 of the lower section. The shaft 62 will therefore have movement as a result of downward movement of the lower section and which is imparted to the eccentric 106, Figure 3, suitably secured by screw 107 to said shaft. The link 108 joins said eccentric to a connection 109, pivoted at 110 to the horizontal leg of an L-shaped member 111. The other end of the connection 109 has pivotally secured thereto at 113 vertically disposed lever 114 having on its upper end the cam surface 115. It will be observed that oscillation of shaft 62 will impart similar movement to eccentric 106 and through the connecting linkage member 114 will be moved upwardly, bringing its cam surface 115 into contact with pin 116. Said pin is carried by the plate member 86 forming the latching means for the upper section. The camming of pin 116 will eventually rock the plate member and release the latch for the upper section, which will travel downwardly as a result of the tension on the parts effected by coil spring 80. The interval of time elapsing between the release of the leading section and the release of the following section will determine the gap or shutter aperture and also the length of the exposure.

In order to vary the shutter gap and also the length of the exposure the invention provides adjustable mechanism in the form of an L-shaped member 111 suitably pivoted by the pivot screw 101 to frame 102. The vertical leg at its lower end is formed with teeth 112 which are adapted to mesh with a worm gear 117 fixed to the rotatable shaft 118 journalled by front frame 11 of the camera and the upright 119. The end of said shaft extending beyond the frame 11 is provided with a knob 120 whereby the operator may rotate the shaft and accordingly the worm gear 117. This rotation of the gear will oscillate member 111 and this movement will vary the pivot point 110 of the connection 109. When the parts are located in their full line position, as shown in Figure 3, the pivot point 110 will be elevated to its maximum extent, thereby locating the cam surface 115 immediately adjacent pin 116. In this position the shutter sections will be tripped practically instantaneously since the movement of the eccentric 106 need be only a fraction of a degree to cause the necessary upward movement of lever 114 to cam pin 116 and release the upper section.

For time exposures the shaft 118 is rotated to its other extreme position, which will locate member 111 and associated parts in the dotted line position of Figure 3. The pivot point 110 will be lowered to its maximum extent and this will locate the cam surface 115 a maximum distance from pin 116. With the parts in this position, when the leading section of the present shutter is tripped by depressing the button 98 release of the following section will not take place since the maximum movement of the eccentric 106 is not sufficient to cause the cam surface 115 to engage the pin 116. The lower section will therefore assume a released position and the upper section will be held in latched position, completely exposing the entire section of film defined by the exposure aperture.

When the button 98 is depressed it will move forwardly the trip arm 121 formed of relatively stiff wire, secured at 122 to the cam lever 100. Said trip arm is positioned so that it will latch over pin 116 when the cam lever 100 has moved inwardly to its full extent. It will therefore be seen that for a time exposure it is only necessary to press the button 98 and hold the same depressed for the length of exposure desired since when the button is released the trip arm 121 will in effect cam the pin 116 and release the latch for the upper or following section of the shutter.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, and independent springs tensioning each section for effecting movement of the same when released.

2. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, resilient means tensioning each section for effecting movement of the same when released, and means for releasing the sections successively.

3. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, resilient means tensioning each section for effecting movement of the same when released, latching means for each section, means for releasing the latch for the leading section, and means actuated by movement of said leading section for tripping the latch for the following section.

4. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, resilient means tensioning each section for effecting movement of the same when released, latching means for each section, manually actuated means for releasing the latch for the leading section, means actuated by movement of said leading section for tripping the latch for the following section, and means for varying the interval of time elapsing between the release of the leading and following sections.

5. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, resilient means tensioning each section for effecting movement of the same when released, latching means for each section, manually actuated means for releasing the latch for the leading section, means actuated by movement of said leading section for tripping the latch for the following section, and mechanism adapted to be set by the operator for varying the interval of time elapsing between the release of the leading section and the following section.

6. In a camera, shutter mechanism for exposing a portion of a film strip defined by an exposure aperture comprising a leading section and a following section, each section forming a light-excluding element of the shutter mechanism and including a part having pivotal movement about a fixed axis disposed parallel to the film strip and another part pivoted to the first mentioned part, the adjacent edges of said sections having interfitting relation, resilient means tensioning each section for effecting movement of the same when released, separate latching means for each section, means for releasing the latch for the leading section, means actuated by the leading section for releasing the following section, adjustable mechanism whereby the interval of time between release of the leading and the following section may be varied, and cam means for returning said sections to initial position.

7. In a camera, shutter mechanism for exposing a portion of a film strip defined by an exposure aperture including a leading section and a following section, each section forming a light-excluding element of the shutter mechanism and including a part having pivotal movement about a fixed axis disposed parallel to the film strip and a second part pivoted to the first mentioned part, the adjacent edges of the last mentioned parts being guided for movement in a plane parallel to that of the film strip, resilient means tensioning each section for effecting movement of the same when released, and means for releasing the sections successively.

8. In a camera, shutter mechanism for exposing a portion of a film strip defined by an exposure aperture including an upper section and a lower section, each section forming a light-excluding element of the shutter mechanism and including a part having pivotal movement about a fixed axis disposed parallel to the film strip and a second part pivoted to the first mentioned part, the adjacent edges of the last mentioned parts being guided for movement in a plane parallel to that of the film strip, resilient means tensioning each section for effecting movement of the same when released, latching means for each section, means for releasing the latch for the lower section, and means actuated by movement of said lower section for tripping the latch for the upper section.

9. In a camera, shutter mechanism for exposing a portion of a film strip defined by an exposure aperture including an upper section and a lower section, each section forming a light-excluding element of the shutter mechanism and including a part having pivotal movement about a fixed axis disposed parallel to the film strip and a second part pivoted to the first mentioned part, the adjacent edges of the last mentioned parts being guided for movement in a plane parallel to that of the film strip, resilient means tensioning each section for effecting movement of the same when released, latching means for each section, manually actuated means for releasing the latch for the lower section, means actuated by movement of said lower section for tripping the latch for the upper section, and mechanism adapted to be set by the operator for varying the interval of time elapsing between the release of the lower section and the upper section.

10. In a camera, shutter mechanism for exposing a portion of a film strip defined by an exposure aperture including an upper section and a lower section, each section forming a light-excluding element of the shutter mechanism and including a part having pivotal movement about a fixed axis disposed parallel to the film strip and a second part pivoted to the first mentioned part, the adjacent edges of the last mentioned parts being guided for movement in a plane parallel to that of the film strip, resilient means tensioning each section for effecting movement of the same when released, latching means for each section, manually actuated means for releasing the latch for the lower section, means actuated by movement of said lower section for tripping the latch for the upper section, mechanism adapted to be set by the operator for varying the interval of time elapsing between release of the lower section and the upper section, and cam means for returning the sections to initial position, said cam means having coaction with the lower section and returning both sections with their adjacent edges in interfitting relation.

11. In a camera, a shutter for exposing a portion of a film strip defined by an exposure aperture including an upper section and a lower section, each section forming a light-excluding element of the shutter and including a part having pivotal movement about a fixed axis disposed parallel to the film strip and a second part pivoted to the first mentioned part and having bodily movement, a shaft supporting the first mentioned part of the upper section, a second shaft spaced therefrom for supporting the first mentioned part of the lower section and which is secured thereto, vertical guide means for guiding the free end of the second mentioned part of each section whereby said ends move in a plane parallel to that of the film strip, and a resilient coil spring for each section for effecting movement of the section when released, the spring for the upper section yieldingly biasing the parts thereof to cause them to straighten out, and the spring for the lower section tensioning the parts thereof to cause one to overlie the other.

12. In a camera, a shutter for exposing a portion of a film strip defined by an exposure aperture including an upper section and a lower section, each section forming a light-excluding element of the shutter and including a part having pivotal movement about a fixed axis disposed parallel to the film strip and a second part pivoted to the first mentioned part and having bodily movement, a shaft supporting the first mentioned part of the upper section, a second shaft spaced therefrom for supporting the first mentioned part of the lower section and which is secured thereto, vertical guide means for guiding the free end of the second mentioned part of each section whereby said ends move in a plane parallel to that of the film strip, a resilient coil spring for each section for effecting movement of the section when released, the spring for the upper section yieldingly biasing the parts thereof to cause them to straighten out, and the spring for the lower section tensioning the parts thereof to cause one to overlie the other, latching means for each section, means for releasing the latch for the lower section, and means actuated by movement of said second shaft in a certain direction for tripping the latch for the upper section.

13. In a camera, a shutter for exposing a portion of a film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement to a plane parallel to that of the film strip, said shoes having interfitting relation, and a resilient coil spring for each section for effecting movement of the section when released, each coil spring being associated with the pivotal connection for the first and second parts of its respective section.

14. In a camera, a shutter for exposing a portion of a film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement to a plane parallel to that of the film strip, said shoes having interfitting relation, and a resilient coil spring for each section for effecting movement of the section when released, each coil spring being associated with the pivotal connection for the first and second parts of its respective section, the spring for the following section yieldingly biasing the parts thereof to cause them to straighten out, and the spring for the leading section tensioning the parts thereof to cause one to overlie the other.

15. In a camera, a shutter for exposing a portion of a film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement to a plane parallel to that of the film strip, said shoes having interfitting relation, and a resilient coil spring for each section for effecting movement of the section when released, latching means for each section, means for releasing the latch for the leading section, and means actuated by movement of said leading section for releasing the latch for the following section.

16. In a camera, a shutter for exposing a portion of a film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement to a plane parallel to that of the film strip, said shoes having interfitting relation, and a resilient coil spring for each section for effecting movement of the section when released, latching means for the leading section adapted to engage with and hold the shoe of said leading section, independent latching means for the following section having engagement with and adapted to hold the shoe of said following section, and means for releasing the latching means in succession.

17. In a camera, a shutter for exposing a portion of a film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement to a plane parallel to that of the film strip, said shoes having interfitting relation, and a resilient coil spring for each section for effecting movement of the section when released, latching means for the leading section adapted to engage with and hold the shoe of said leading section, independent latching means for the following section having engagement with and adapted to hold the shoe of said following section, means for releasing the latching means in succession, and cam means for returning the sections to initial latched position, said cam means applying movement to the shoe of the leading section whereby both sections are returned with the shoes thereof in contact.

18. In a camera, a shutter for exposing a portion of film strip defined by an exposure aperture including a leading section and a following section, each section forming a light-excluding element of the shutter and comprising a part supported for pivotal movement about an axis disposed parallel to the film strip, a second part pivoted to the first mentioned part and adapted to have bodily movement, and a shoe pivotally secured to the end of the second part, guiding means for the shoes confining their movement in a plane parallel to that of the film strip, said shoes having interfitting relation, and a resilient coil spring for each section for effecting movement of the section when released, latching means for the leading section adapted to engage with and hold the shoe of said leading section, independent latching means for the following section having engagement with and adapted to hold the shoe of said following section, means for releasing the latch for the leading section, means actuated by movement of said leading section for tripping the latch for the following section, and adjustable mechanism for varying the interval of time elapsing between the release of the leading section and release of the following section.

LEWIS H. MOOMAW.